United States Patent
Goto et al.

(10) Patent No.: US 7,316,418 B2
(45) Date of Patent: Jan. 8, 2008

(54) ELASTIC COUPLING

(75) Inventors: Tadashi Goto, Aichi (JP); Yoji Shimasaki, Aichi (JP)

(73) Assignees: Mitsubishi Jidosha Kogyo Kabushiki Kaisha, Tokyo (JP); Mitsubishi Jidosha Engineering Kabushiki Kaisha, Okazaki-Shi, Aichi (JP)

( * ) Notice: Subject to any disclaimer, the term of this patent is extended or adjusted under 35 U.S.C. 154(b) by 339 days.

(21) Appl. No.: 10/828,158

(22) Filed: Apr. 21, 2004

(65) Prior Publication Data

US 2005/0017493 A1    Jan. 27, 2005

(30) Foreign Application Priority Data

Apr. 21, 2003    (JP)    ............... 2003-116096

(51) Int. Cl.
*B62D 1/16*    (2006.01)

(52) U.S. Cl. ......................... 280/779; 464/51

(58) Field of Classification Search ................ 280/779, 280/780, 777, 775; 74/492, 552; 464/140, 464/162, 51, 91
See application file for complete search history.

(56) References Cited

U.S. PATENT DOCUMENTS 1,572,519 A * 2/1926 Davis ........................... 74/492
2,198,654 A * 4/1940 Calkins et al. ................. 464/9
2,272,900 A * 2/1942 Saurer .......................... 464/91
5,956,836 A * 9/1999 Dupuie ....................... 29/469.5
6,120,046 A * 9/2000 Daly ............................ 280/90
6,270,418 B1 * 8/2001 Oka et al. ..................... 464/89
6,283,867 B1 * 9/2001 Aota et al. ................... 464/74
6,733,039 B2 * 5/2004 Honda et al. ............... 280/780

FOREIGN PATENT DOCUMENTS

| DE | 1097297 B | 1/1961 |
| DE | 1530971 A | 8/1970 |
| GB | 2370093 A | 6/2002 |
| JP | 9-196077 A | 7/1997 |
| JP | 10-19054 A | 1/1998 |

* cited by examiner

*Primary Examiner*—Paul N. Dickson
*Assistant Examiner*—Drew J. Brown
(74) *Attorney, Agent, or Firm*—Birch, Stewart, Kolasch & Birch, LLP

(57) ABSTRACT

An elastic coupling capable of sufficiently absorbing a shake of a steering shaft in its axis direction to prevent a driver from feeling uncomfortable due to the shake is provided. A rubber elastic body including lubricant is provided between an outer circumference of an inner casing having a roughly cross shape in section and an inner circumference of an outer casing while the outer casing and the rubber elastic body are enabled to slide in their axis direction so as to absorb a shake in the axis direction from a steering gear box side.

6 Claims, 3 Drawing Sheets

ELASTIC COUPLING

CROSS REFERENCE TO RELATED APPLICATION

This Nonprovisional application claims priority under 35 U.S.C. § 119(a) on Patent Application No. 2003-116096 filed in Japan on Apr. 21, 2003, the entire contents of which are hereby incorporated by reference.

BACKGROUND OF THE INVENTION

1. Field of the Invention

The present invention relates to an elastic coupling provided in a steering shaft of a steering device for a vehicle.

2. Description of the Related Art

As is known, in a structure of a steering device of a vehicle, a steering shaft connects a steering gear box provided on a cross member of a body of the vehicle with a steering wheel provided adjacent to a driver's seat, and rotation of the steering wheel is transmitted to the steering gear box via the steering shaft to steer right and left wheels by means of the steering gear box. The steering shaft is provided with an elastic coupling in order to prevent an input from a road, a shake (vibration) of an engine or the like from being transmitted to the steering wheel side (see JP 9-196077A, for example).

In a steering device disclosed in JP 9-196077A, a steering coupling as an elastic coupling is incorporated in an intermediate shaft connecting a steering gear box with a main shaft. The steering coupling comprises cylindrical metal fittings connected on the steering gear box side, shaft metal fittings connected on the main shaft side and a rubber elastic body provided between an inner circumference of the cylindrical metal fittings and an outer circumference of the shaft metal fittings. The inner circumference of the cylindrical metal fittings and the outer circumference of the shaft metal fittings are respectively formed into a roughly cross shape in section. The rubber elastic body has a corresponding shape in section and is provided between the both metal fittings. This allows rotation from the steering wheel to be transmitted to the steering gear box side through the rubber elastic body and a shimmy from the steering gear box side (a shake around a rotation shaft) to be absorbed by elastically changing a shape of the rubber elastic body.

As is known, a steering gear box is provided on a cross member of a body of a vehicle, and thereby, there is a phenomenon that the steering gear box is displaced up and down and right an left due to bending of a cross member per se or bending of a mounting portion of the steering gear box when the steering gear box receives an input from a road through a member such as a wheel to be steered, a tie rod or the like.

Such displacement is transmitted to a steering coupling as a shake in an axis direction. In the steering coupling disclosed in JP 9-196077A, however, there is a problem that the shake in an axis direction is transmitted since a shimmy, which is a shake around a rotation shaft, is only assumed. In more detail, a rubber elastic body of a steering coupling is vulcanized and adhered to an inner surface of cylindrical metal fittings while pressured and inserted in an outer circumferential surface of shaft metal fittings, so that it cannot move relatively to any of the cylindrical metal fittings and the shaft metal fittings. Therefore, an operation of absorbing a shake in an axis direction has only an effect that the rubber elastic body is slightly elastically changed in shape in an axis direction, so that most of the shake is transmitted as it is. As a result, there is a problem caused that a driver handling a steering wheel feels uncomfortable.

SUMMARY OF THE INVENTION

The present invention provides an elastic coupling capable of preventing a driver from feeling uncomfortable due to a shake by completely absorbing shake of a steering shaft in the axis direction thereof One aspect of the present invention is directed to an elastic coupling comprising: a cylinder member, which is connected to one of a steering gear box side and a steering wheel side and opens toward the other; a shaft member, which is connected to the other one of the steering gear box side and the steering wheel side and which is inserted in the cylinder member with a predetermined gap formed between the shaft member and a bottom of the cylinder member; a first elastic body provided between an inner circumferential surface of the cylinder member and an outer circumferential surface of the shaft member so that relative rotation of the cylinder member and the shaft member may be limited by means of resilience; a sliding portion, that enables relative movement of the cylinder member and the shaft member in an axis direction, provided at least either between the inner circumferential surface of the cylinder member and the first elastic body or between the outer circumferential surface of the shaft member and the first elastic body.

In the above structure, rotation of the steering wheel is transmitted to the steering gear box side through the first elastic body provided between the cylinder member and the shaft member to perform an operation of steering a wheel to be steered. On the other hand, when a shimmy, which is a shake around a rotation shaft, is transmitted from the steering gear box side, the transmitted shimmy is absorbed by elastic change in shape of the first elastic body.

When a shake in the axis direction is transmitted from the steering gear box side, any one of the cylinder member and the shaft member, which is connected to the steering gear box side, shakes in the axis direction. The cylinder member and the shaft member, however, move relatively in the axis direction through the sliding portion. As a result, the shake in the axis direction is absorbed without transmitted to the other one of the cylinder member and the shaft member.

BRIEF DESCRIPTION OF THE DRAWINGS

The present invention will become more fully understood from the detailed description given hereinbelow and accompanying drawings which are given by way of illustration only, and thus are not limitative of the present invention, and wherein.

DETAILED DESCRIPTION OF THE INVENTION

A mode for carrying out the invention of an elastic coupling in which the invention is embodied will be described hereinafter.

Figure 1:
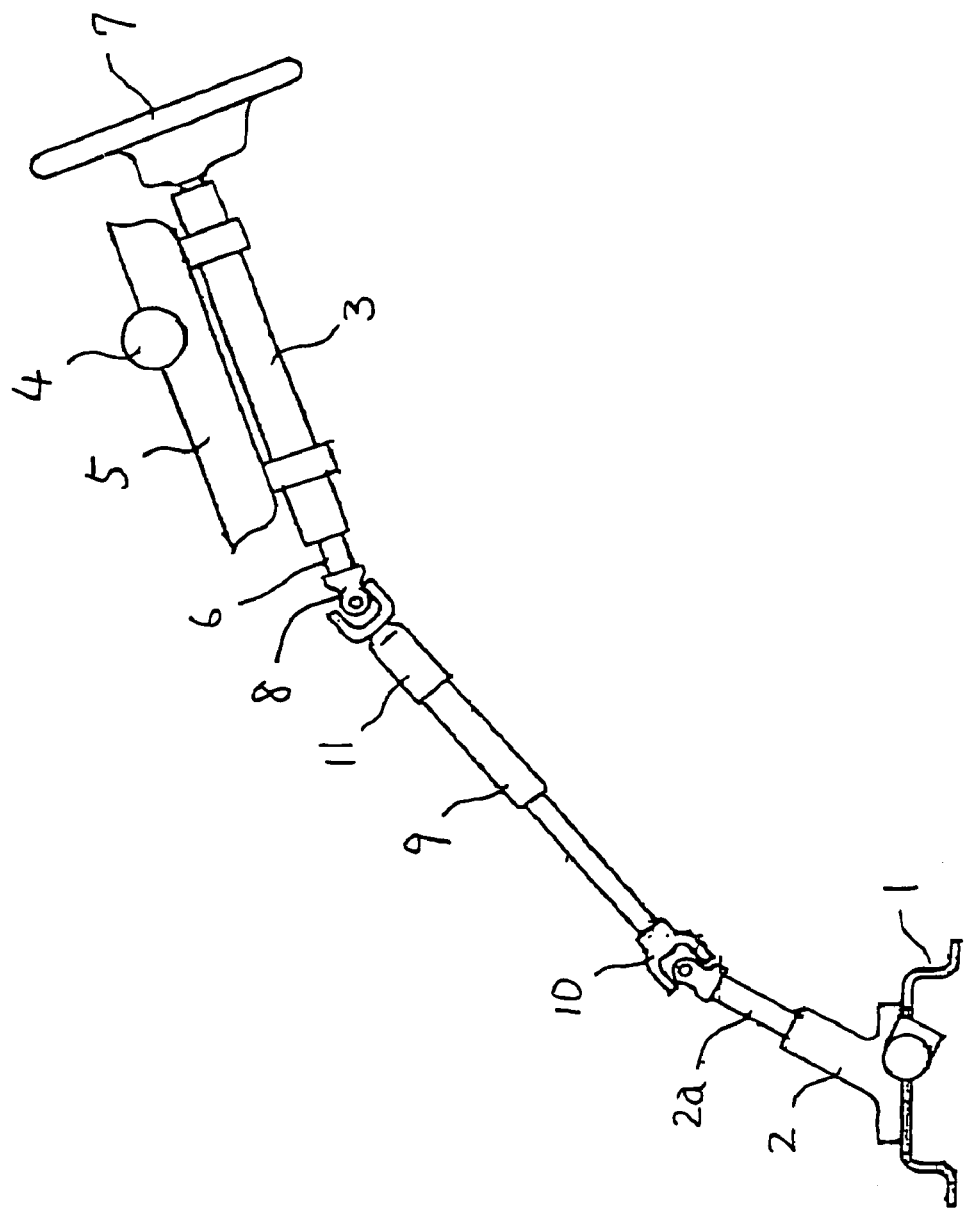
FIG. 1 is an entire structural view of a steering device in accordance with an embodiment of the present invention.

FIG. 1 is an entire structural view of a steering device in accordance with this embodiment. In FIG. 1, a steering device is shown in the view from a side of a vehicle. Reference numeral 1, in FIG. 1, denotes a cross member provided inside an engine compartment of the vehicle in the width direction thereof. Both ends of the cross member 1 are fixed to right and left side members through a rubber bush in this embodiment although this is not shown in the drawing. An object of the above structure is to reduce shake and noise in the vehicle. In the above structure, the rubber bush absorbs shake transmitted to the cross member through a suspension so that the shake is prevented from being transmitted to a compartment of the vehicle via a side member.

A steering gear box 2 is fixed on the cross member 1 by means of a bolt and is connected to right and left wheels to be steered through a member such as a tie rod provided on the right and left sides although this is not shown in the drawing.

On the other hand, a steering column 3 is provided facing a driver's seat in a compartment of the vehicle so as to be fixed by means of a supporting bracket 5 to a deck cross member 4 bridged in a body of the vehicle in the width direction thereof. In the steering column 3, a main shaft 6 is held so as to be able to rotate. A steering wheel 7 is fixed on an upper end of the main shaft 6. A lower end of the main shaft 6 is connected to an upper end of an intermediate shaft 9 through a universal joint 8. A lower end of the intermediate shaft 9 is connected to an input shaft 2a of the above-mentioned steering gear box 2 through a universal joint 10.

Accordingly, the input shaft 2a of the steering gear box 2 is rotated through the main shaft 6 and the intermediate shaft 9 when the steering wheel 7 is rotated, and then, the rotation of the input shaft 2a is converted in the gear box 2 into right-and-left linear movement, so that the right and left wheels to be steered through the tie rod with a hydraulic assist in the power steering mechanism.

Figure 2:
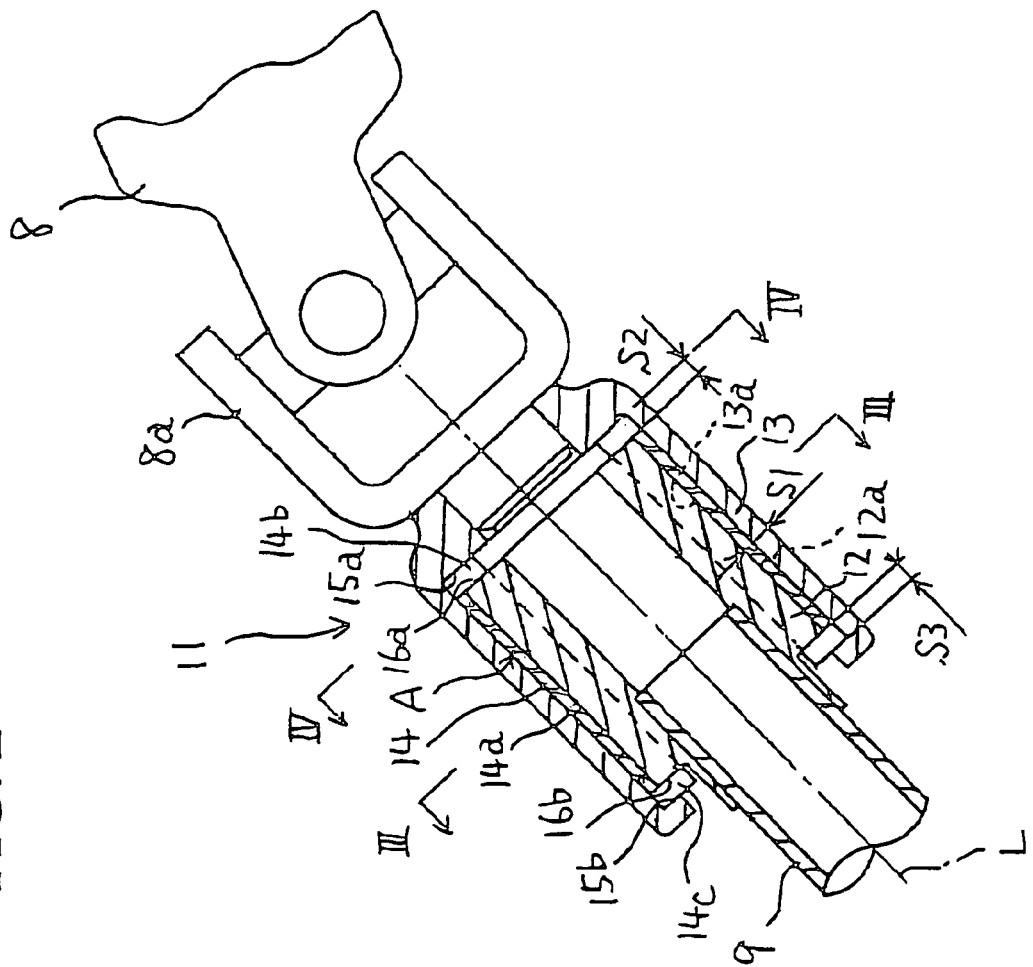
FIG. 2 is an enlarged sectional view of an elastic coupling.
Figure 3:
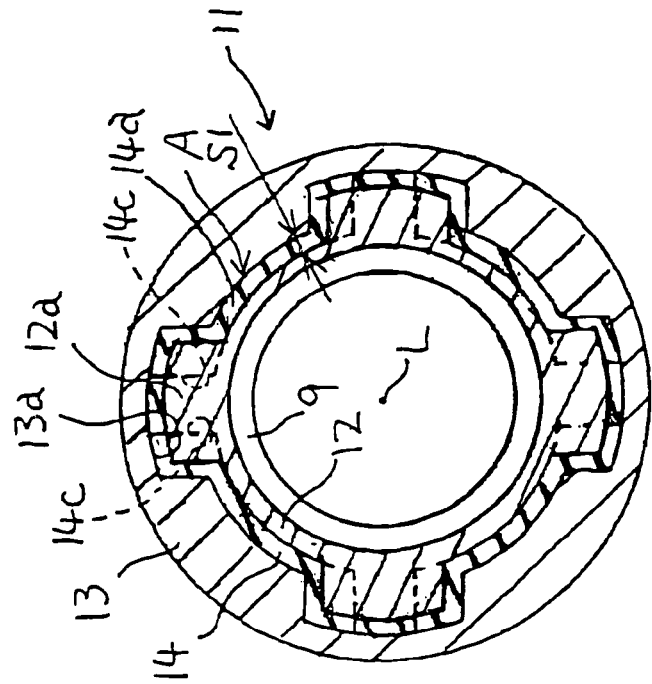
FIG. 3 is also a sectional view of the elastic coupling along the line III-III in FIG. 2.
Figure 4:
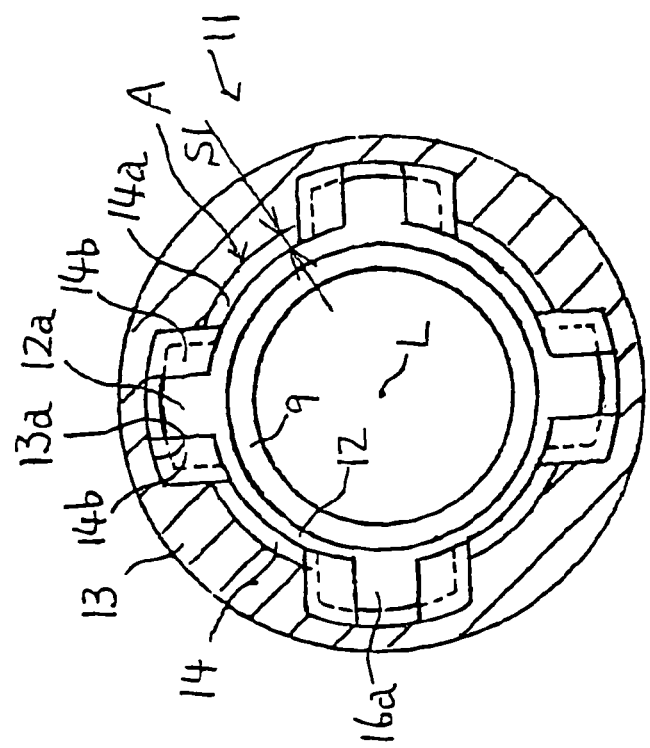
FIG. 4 is also a sectional view of the elastic coupling along the line IV-IV in FIG. 2.

An elastic coupling 11 is provided in the upper part of the above-mentioned intermediate shaft 9. FIG. 2 is an enlarged sectional view of the elastic coupling 11. FIG. 3 is also a sectional view of the elastic coupling 11 along the line III-III in FIG. 2. FIG. 4 is also a sectional view of the elastic coupling 11 along the line IV-IV in FIG. 2. A structure of the elastic coupling 11 will be described in detail hereinafter in accordance with these drawings.

An inner casing 12 (a shaft member) of the elastic coupling 11 is in the shape of a cylinder and has an axis L common to the intermediate shaft 9. The lower part of the inner casing 12 is welded and fixed so as to be outwardly fitted to the upper end of the intermediate shaft 9. An outer casing 13 (a cylinder member), which is in the shape of a cylinder and has the common axis L, is provided with a play on the outer circumference side of the inner casing 12. The upper end of the outer casing 13 is welded and fixed to a yoke 8a of the universal joint 8.

Four protrusions 12a are formed on the outer circumference of the inner casing 12 along the axis direction with a space of 90 degrees about the axis L so as to be in a roughly cross shape in section. On the other hand, four concave grooves 13a are formed on the inner circumference of the outer casing 13 along the axis direction with a space of 90 degrees about the axis L in order to correspond to the respective protrusions 12a so as to be in a roughly cross shape in section. Each of the protrusions 12a of the inner casing 12 is thus located in each of the concave grooves 13a of the outer casing 13. A gap S1, which is roughly even all over, is formed between an outer circumferential surface of the inner casing 12 including the protrusions 12a and an inner circumferential surface of the outer casing 13 including the concave grooves 13a. In the gap S1, a rubber elastic body 14 whose shape in section corresponds to the above-mentioned gap S1 is inserted.

The rubber elastic body 14 is vulcanized and formed into one body with the inner casing 12 while it is formed into a member separate from the outer casing 13 so as to be inserted therein.

The inner casing 12 and the outer casing 13 thus compress and change in shape the rubber elastic body 14 between a side surface of the protrusion 12a and a side surface of the concave groove 13a, which are opposed to each other with a predetermined space, limiting relative rotation about the axis L. At the same time, they enable the outer circumferential surface of the rubber elastic body 14 and the inner circumferential surface of the outer casing 13 to be in contact each other and slide so as to relatively move in the axis direction. That is to say, a sliding portion A is formed between the outer circumferential surface of the rubber elastic body 14 and the inner circumferential surface of the outer casing 13, which may be in contact each other and slide, in this embodiment.

Here, the rubber elastic body 14 in this embodiment is arranged to include lubricant having an operation of reducing a coefficient of friction so that only small power is used for easily carrying out the slide between the rubber elastic body 14 and the outer casing 13 without generating any abnormal sound. Paraffin, silicon-based oil, a variety of synthetic grease and such can be used as the lubricant. It is possible to select any of such lubricant to be included in the rubber elastic body 14 in order to attain a desired coefficient of friction. As for a method of reducing the coefficient of friction, lubricant such as grease may be applied between the outer circumferential surface of the rubber elastic body 14 and the inner circumferential surface of the outer casing 13 instead of the above-mentioned method relating to a material of the rubber elastic body 14.

As shown in FIG. 2, the yoke 8a of the universal joint 8 closes the upper end of the outer casing 13, which opens downwardly (toward the intermediate shaft 9). An upper stopper surface 15a (a bottom part) is formed on the upper end of the outer casing 13. The opening end of the outer casing 13 extends to the inner circumference side. The upper surface of the extended portion is defined as a lower stopper surface 15b (a flange portion).

The upper stopper surface 15a opposes an upper stopper surface 16a formed on the upper end of each protrusion 12a of the inner casing 12 with a gap S2 in the axis direction. Similarly, the lower stopper surface 15b opposes a lower stopper surface 16b formed on the lower end of each protrusion 12a of the inner casing 12 with a gap S3 in the axis direction. The both gaps S2 and S3 are assumed to be in the same size in this embodiment, but the size may be different.

The length of the rubber elastic body 14 in the axis direction is the same as that of the inner casing 12 as a whole, and the part corresponding to the above length is defined as a main body 14a (a first elastic body). From the main body 14a, provided are an upper centering portion 14b (a second elastic body) and a lower centering portion 14c (a third elastic body) to respectively extend upwardly and downwardly at a place corresponding to a corner of each protrusion 12a and concave groove 13a. The upper centering portion 14b is located in the above-mentioned gap S2 to be provided between the upper stopper surfaces 15a and 16a. The lower centering portion 14c is similarly located in the above-mentioned gap S3 to be provided between the lower stopper surfaces 15b and 16b.

Providing the centering portions 14b and 14c of the rubber elastic body 14 between the opposite upper stopper surfaces 15a and 16a and between the opposite lower stopper surfaces 15b and 16b as described above allows the inner casing 12 and the outer casing 13 to be held in predetermined positions in the axis direction and further allows the both centering portions 14b and 14c to be compressed and changed in shape to relatively move in the axis directions as described above.

A structure of the steering device in this embodiment is as described above. In the structure, a variety of shake occurring on the steering gear box 2 side are absorbed by means of an elastic coupling 11 as described below.

First, in the case that the steering wheel 7 is rotated, the rotation is transmitted to the outer casing 13 of the elastic coupling 11 through the main shaft 6 and the universal joint 8. At that time, one side surface of the respective concave grooves 13a of the outer casing 13 (a side surface on the reverse rotation side) pressures an opposed side surface of the respective protrusions 12a of the inner casing 12 (equally, a side surface on the reverse rotation side), compressing and changing in shape the main body 14a of the rubber elastic body 14. Therefore, the inner casing 12 rotates together with the direction that the outer casing 13 rotates. The rotation is further inputted to the steering gear box 2 from the intermediate shaft 9 to steer the right and left wheels to be steered.

In the case that a shimmy occurs in the input shaft 2a of the steering gear box 2 in receiving an input from a road or the like, the shimmy, which has occurred, is transmitted to the inner casing 12 of the elastic coupling 11 through the intermediate shaft 9. A shake due to the shimmy is switched between the clockwise and counterclockwise directions about a rotation axis in a short cycle, different from the above-described continuous one-way rotating operation. Accordingly, compressing and changing in shape the main body 14a of the rubber elastic body 14 allows the shake to be absorbed, and thereby, the shimmy can be prevented from being transmitted to the steering wheel 7 side.

On the other hand, in the case that the steering gear box 2 receives an input from a road through a member such as a wheel to be steered, a tie rod or the like, a phenomenon that the steering gear box 2 is displaced up and down and right and left occurs due to bending of the cross member 1 per se or bending of a mounting portion of the gear box 2. Such displacement causes a shake of the input shaft 2a of the steering gear box 2 in the axis direction. The shake having occurred in the axis direction is transmitted to the inner casing 12 of the elastic coupling 11 through the intermediate shaft 9.

At that time, the rubber elastic body 14 also shakes in the axis direction together with the inner casing 12. The inner casing 12 and the outer casing 13, however, relatively move in the axis direction since the outer circumferential surface of the main body 14a of the rubber elastic body 14 and the inner circumferential surface of the outer casing 13 slide each other, so that the shake of the inner casing 12 in the axis direction is absorbed without being transmitted to the outer casing 13.

The top end of the inner casing 12 (the upper stopper surface 16a) repeats movement toward and away from the top end of the outer casing 13 (the upper stopper surface 15a) in accordance with the relative movement in the axis direction. The upper centering portion 14b provided between the above top ends, however, prevents the direct collision, so that the noise of a strike due to the collision between metals can be restrained in advance.

On the other hand, the centering portions 14b and 14c of the rubber elastic body 14 return to their original sectional shapes due to the resilience of themselves after the shake in the axis direction disappears. The inner casing 12 and the outer casing 13 are thus returned to the initial positions (a neutral position where the gaps S2 and S3 are equal as described above), and then, an operation of absorbing the shake similar to the above is performed when a shake in the axis direction occurs again after the return.

As is clear from the above description, the resilience of the centering portions 14b and 14c of the rubber elastic body 14 should have an upper limit, which is a degree of not disturbing the relative movement of the inner casing 12 and the outer casing 13 in the axis direction, and a lower limit, which is a degree of enabling the inner casing 12 and the outer casing 13 to return to the initial positions. As for a material of the rubber elastic body 14, a material having an optimal elastic modulus is selected in view of absorbing of a shimmy, and therefore, the resilience within the above range should be given to the centering portions 14b and 14c, premising the above elastic modulus.

In this embodiment, adjusting the area of the centering portions 14b and 14c (concretely, the total area of the upper and lower centering portions 14b and 14c) allows the proper resilience to be achieved. As a result, the inner casing 12 and the outer casing 13 relatively move without being disturbed by the centering portions 14b and 14c to perform a secure operation of absorbing the shake, while they are surely returned to the initial positions after the shake disappears.

As described in detail hereinbefore, in the steering device in this embodiment, the rubber elastic body 14 is formed as a separate member from the outer casing 13 of the elastic coupling 11 to be able to slide in the axis direction, and therefore, the elastic coupling 11 can perform an operation of absorbing a shake in the axis direction, the shake caused by bending of the cross member 1 per se or bending of the mounting portion of the gear box 2, in addition to an operation as a shimmy dumper for absorbing a shimmy.

Especially in the vehicle in this embodiment, there is a characteristic that displacement of a position of the steering gearbox 2, and thereby, a shake in the axis direction easily occur, compared with the case of a normal structure of a body of a vehicle in which the cross member is rigid-connected, since a body of the vehicle in this embodiment is constructed so that the cross member 1 is fixed to the side member through a rubber bush. The shake having occurred, however, can be surely absorbed by the elastic coupling 11, so that such harmful effect as described above can be prevented. Therefore, the elastic coupling 11 can sufficiently absorb a shake in the axis direction to avoid uncomfortableness of a driver due to a shake of the steering wheel 7.

Furthermore, the inner casing 12 and the outer casing 13 are returned to their initial positions by means of the centering portions 14b and 14c of the rubber elastic body 14 after the shake in the axis direction disappears, so that a stable operation of absorbing the shake can be performed all the time.

Moreover, the upper centering portion 14b of the rubber elastic body 14 can also operate to prevent a collision between the inner casing 12 and the outer casing 13, which is caused in accordance with the shake in the axis direction. There is thus an advantage obtained such that the noise of a strike due to the collision between metals can be restrained, and thereby, the noise in a compartment of the vehicle can be reduced.

On the other hand, compared with an elastic coupling in JP 9-196077A described as a prior art, the elastic coupling 11 in this embodiment has such a simple structure that the rubber elastic body 14 including lubricant is provided as a separate member from the outer casing 13 to be able to slide and the centering portions 14b and 14c are formed on the both of the upper and lower ends of the rubber elastic body 14. Accordingly, the elastic coupling 11 in this embodiment may be put into practice with little rise in cost to achieve the above-mentioned variety of superior operational effects.

Furthermore, the shake-absorbing operation of the elastic coupling 11 allows the shake in the axis direction to hardly operate on the steering column 3, so that securing the strength as a countermeasure against the shake is not necessary for a supporting bracket 5 supporting the steering column 3. Therefore, in accordance with the elastic coupling 11 in this embodiment, there is also such an advantage obtained that the manufacturing cost can be rather reduced.

The mode of the invention is not limited to the above embodiment although description of the embodiment has been completed above. For example, the elastic coupling 11 is provided on the intermediate shaft 9 of the steering device in the above-mentioned embodiment. The location for providing the elastic coupling 11 is, however, not limited to the above. The elastic coupling 11 may be provided on the input shaft 2a of the steering gear box 2 or the main shaft 6, for example.

In the above-mentioned embodiment, the four protrusions 12a on the inner casing 12 side are engaged with the four concave grooves 13a on the outer casing 13 side through the rubber elastic body 14 so as to obtain functions of transmitting rotation and absorbing a shimmy. The engaging state between the inner casing 12 and the outer casing 13 is, however, not limited to the above. The protrusions 12a or the concave grooves 13a may be changed in number and may be provided with unequal space, for example.

Moreover, in the above-mentioned embodiment, the rubber elastic body 14 is capable of sliding against the outer casing 13. The rubber elastic body 14, however, may be provided to slide against the inner casing 12 and formed into one body with the outer casing 13, or may be constructed so as to be capable of sliding against the both of the inner casing 12 and the outer casing 13, respectively.

In the above-mentioned embodiment, the centering portions 14b and 14c are formed into one body with the rubber elastic body 14 so that the inner casing 12 and the outer casing 13 would be actively returned to their initial positions after the shake disappears. Such function is not necessarily required, however. The centering portions 14b and 14c may be omitted from the structure.

The number, a shape and such of the centering portions 14b and 14c are not limited to the above embodiment even in the case of providing the centering portions 14b and 14c. For example, the centering portions 14b and 14c may be formed separately from the main body 14a of the rubber elastic body 14 or may be only provided on the two protrusions 12a and the two concave grooves 13a, which are opposed at an angle of 180 degrees, among the four protrusions 12a and the four concave grooves 13a. It is also possible to provide a Belleville spring or a coil spring in the gaps S2 and S3 instead of the centering portions 14b and 14c so as to obtain the similar operation.

As described above, in accordance with the elastic coupling of the invention, a shake of the steering shaft in the axis direction can be sufficiently absorbed to prevent a driver from feeling uncomfortable due to the shake.

Furthermore, in accordance with the elastic coupling of the invention, a sliding portion can be provided in a simple structure, resulting in reducing of a manufacturing cost, in addition to the effect mentioned above.

In accordance with the elastic coupling of the invention, it is also possible to restrain the noise of a strike due to a collision between a cylinder member and a shaft member, so that the noise in a compartment of a vehicle can be reduced, in addition to the above effects.

Moreover, in accordance with the elastic coupling of the invention, a shaft member and a cylinder member are returned to their initial positions by means of a second elastic body and a third elastic body after the shake in the axis direction disappears, so that a stable operation of absorbing the shake can be performed all the time, in addition to the above effects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An elastic coupling, comprising:
a cylinder member having a first stopper surface;
a shaft member inserted in the cylinder member with a predetermined gap between the shaft member and the cylinder member and having a second stopper surface opposing the first stopper surface;
a first elastic body provided in the predetermined gap between an inner circumferential surface of the cylinder member and an outer circumferential surface of the shaft member; and
a second elastic body provided in the predetermined gap and between the first stopper surface and the second stopper surface,
wherein, the second elastic body makes contact with the first stopper surface and the second stopper surface.

2. The elastic coupling according to claim 1, wherein a protrusion is formed in the outer circumference of the shaft member while a concave groove is formed in the inner circumference of the cylinder member, and the protrusion of the outer circumference of the shaft member is located inside the concave groove of the inner circumference of the cylinder member to limit relative rotation.

3. The elastic coupling according to claim 1, wherein an upper end of the cylinder member is fixed to a yoke of a universal joint while the shaft member is provided on a top end of an intermediate shaft.

4. The elastic coupling according to claim 1, wherein the first elastic body includes lubricant.

5. The elastic coupling according to claim 4, wherein the lubricant is any one of paraffin, silicon-based oil and a synthetic grease.

6. An elastic coupling, comprising:
a cylinder member having a first stopper surface;
a shaft member inserted in the cylinder member with a predetermined gap between the shaft member and the cylinder member and having a second stopper surface opposing the first stopper surface;
a first elastic body provided in the predetermined gap between an inner circumferential surface of the cylinder member and an outer circumferential surface of the shaft member; and a second elastic body provided in the predetermined gap and between the first stopper surface and the second stopper surface, wherein the first stopper surface includes two surfaces that are formed at opposite ends of the cylinder member in an axis direction, respectively, the second stopper surface includes two surfaces that are formed at opposite ends of the shaft member in the axis direction, respectively, and the second elastic body includes two elastic bodies that are provided in opposite ends of the predetermined gap in the axis direction, respectively.

* * * * *